(12) United States Patent
Ruffin

(10) Patent No.: US 12,351,478 B2
(45) Date of Patent: Jul. 8, 2025

(54) SYSTEM AND METHOD FOR MANUFACTURING A SYSTEM FOR FILTERING AND DISINFECTING DRINKING WATER

(71) Applicant: Excelitas Canada, Inc., Mississauga (CA)

(72) Inventor: Marvin Ruffin, Chicago, IL (US)

(73) Assignee: Excelitas Canada, Inc., Mississauga (CA)

( * ) Notice: Subject to any disclaimer, the term of this patent is extended or adjusted under 35 U.S.C. 154(b) by 669 days.

(21) Appl. No.: 17/607,225

(22) PCT Filed: May 16, 2019

(86) PCT No.: PCT/US2019/032568
§ 371 (c)(1),
(2) Date: Oct. 28, 2021

(87) PCT Pub. No.: WO2020/231435
PCT Pub. Date: Nov. 19, 2020

(65) Prior Publication Data
US 2022/0220004 A1    Jul. 14, 2022

(51) Int. Cl.
*C02F 1/00* (2023.01)
*C02F 1/32* (2023.01)

(52) U.S. Cl.
CPC .............. *C02F 1/003* (2013.01); *C02F 1/325* (2013.01); *C02F 2201/006* (2013.01); *C02F 2201/3222* (2013.01); *C02F 2209/44* (2013.01)

(58) Field of Classification Search
CPC ...... C02F 1/00; C02F 1/32; C02F 1/46; C02F 1/42; C02F 1/72; C02F 1/34; C02F 1/78; B01D 32/34; B01D 2201/307
(Continued)

(56) References Cited

U.S. PATENT DOCUMENTS 5,061,367 A    10/1991   Hatch et al.
5,151,180 A     9/1992   Giordano et al.
(Continued)

FOREIGN PATENT DOCUMENTS

CN     105668899      6/2018
KR    20040031651      4/2004
(Continued)

OTHER PUBLICATIONS

WO-2013141615-A1 translation (Year: 2013).*
International Search Report for PCT/US19/32568 mailed Nov. 20, 2019.

*Primary Examiner* — Madeline Gonzalez
(74) *Attorney, Agent, or Firm* — Wolf, Greenfield & Sacks, P.C.

(57) ABSTRACT

A water filter system includes a water filter assembly and an enclosure. The water filter assembly has a housing with a water inlet and a water outlet, a filter portion within the housing, and a reservoir portion within the housing apart from the filter portion. A window in the housing conveys ultraviolet light into the reservoir from an external light source. A water channel conveys water from the inlet to the outlet through the filter and the reservoir portions. The enclosure removably receives the water filter assembly in a cavity within the enclosure. An enclosure water inlet mates with the filter water inlet, and an enclosure water outlet mates with the filter water outlet. A light source within the enclosure is arranged to direct light into the reservoir portion.

20 Claims, 14 Drawing Sheets

(58) Field of Classification Search
USPC .............. 210/748.1, 232, 282, 455, 440–444,
210/94–95
See application file for complete search history.

(56) References Cited

U.S. PATENT DOCUMENTS

| | | |
|---|---|---|
| 5,597,482 A | 1/1997 | Melyon |
| 7,000,894 B2 | 2/2006 | Olson et al. |
| 7,147,773 B2 | 12/2006 | Mitchell et al. |
| 9,855,363 B2 | 1/2018 | Stokes et al. |
| 9,861,721 B2 | 1/2018 | Stokes et al. |
| 10,029,026 B2 | 7/2018 | Stokes et al. |
| 2004/0118779 A1 | 6/2004 | Rawson et al. |
| 2009/0123347 A1 | 5/2009 | Laing |

FOREIGN PATENT DOCUMENTS

| | | | | |
|---|---|---|---|---|
| WO | WO-03073029 A1 * | 9/2003 | ........... | B01D 5/0003 |
| WO | WO-2005100251 A1 * | 10/2005 | ............ | B01D 61/08 |
| WO | WO-2013141615 A1 * | 9/2013 | .............. | C02F 1/002 |
| WO | 2016194892 | 12/2016 | | |

* cited by examiner

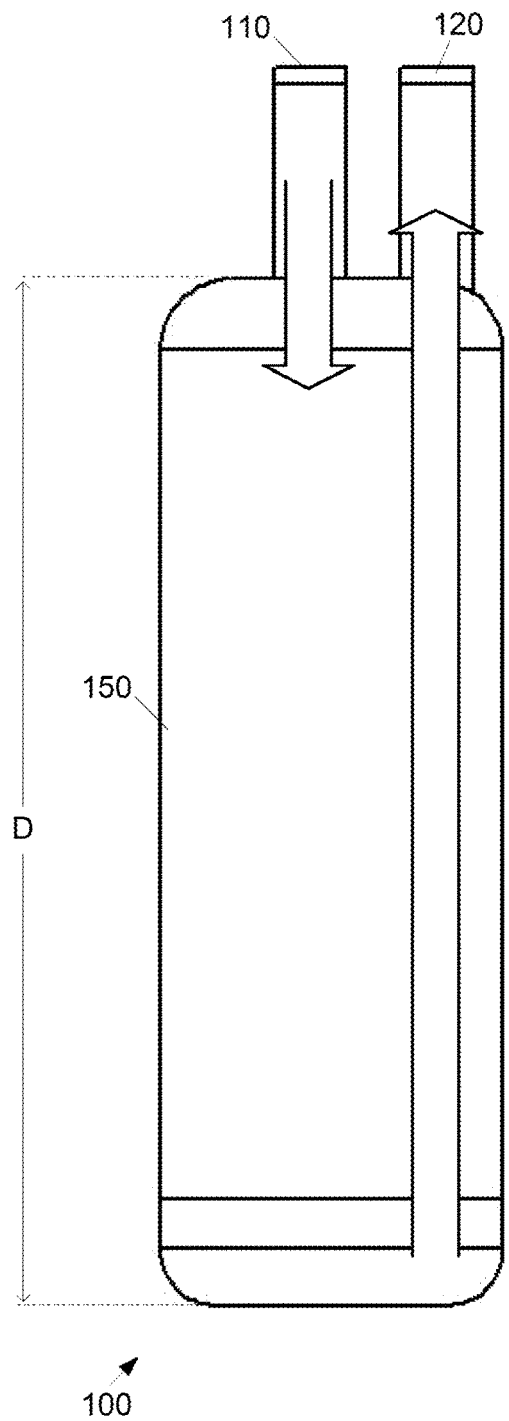
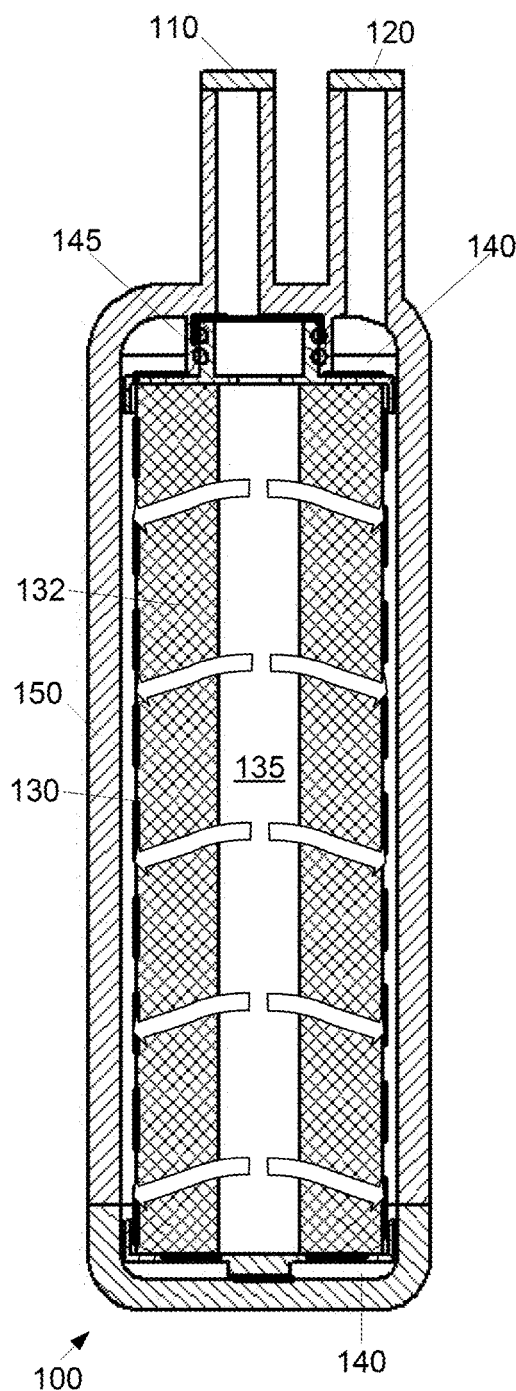
FIG. 1A
(Prior Art)
FIG. 1B
(Prior Art)

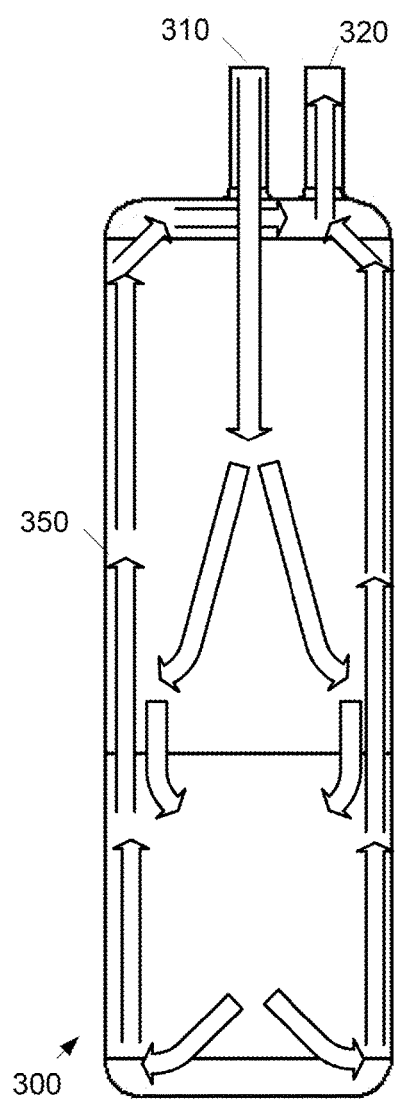
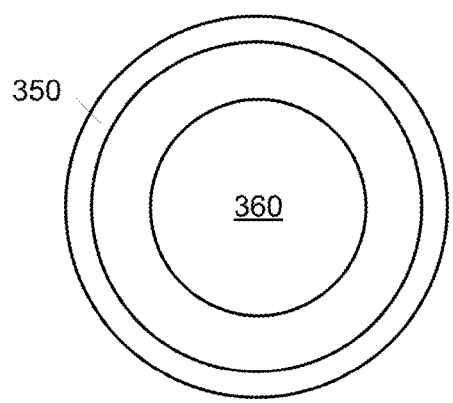
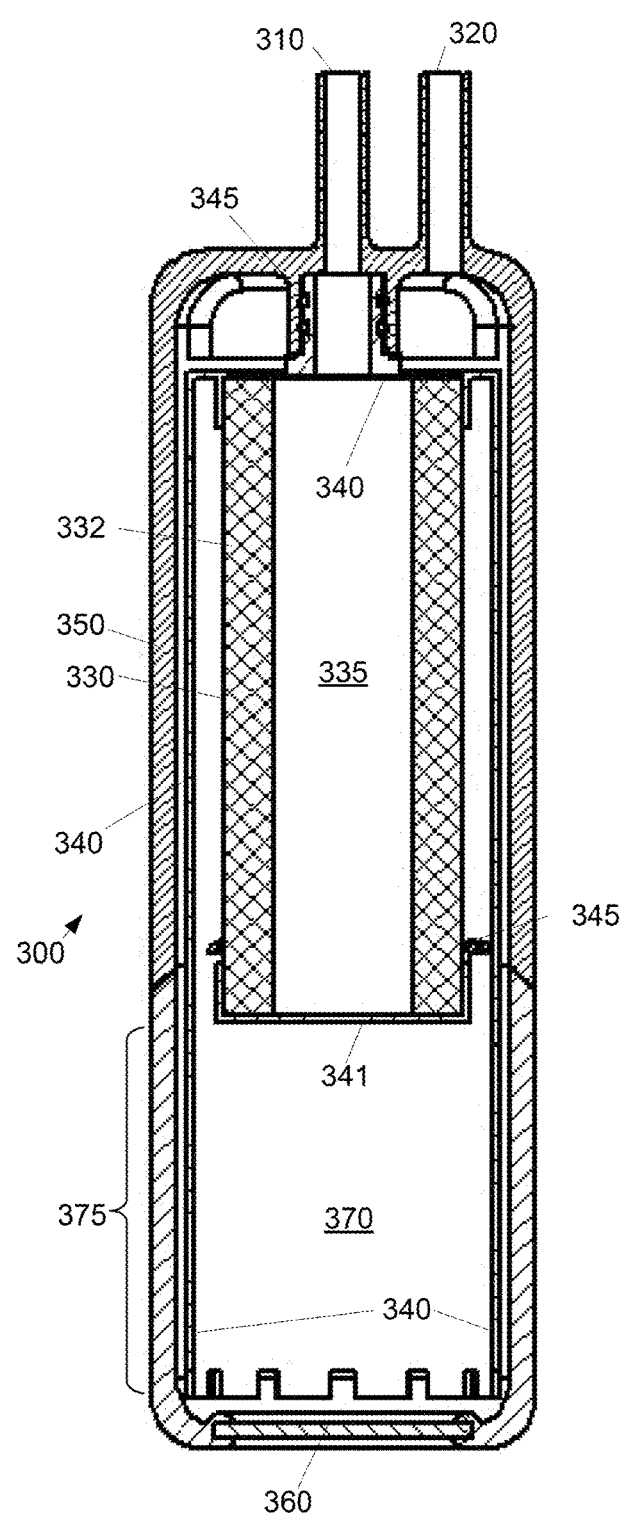
FIG. 3A
FIG. 3B
FIG. 3C

SYSTEM AND METHOD FOR MANUFACTURING A SYSTEM FOR FILTERING AND DISINFECTING DRINKING WATER

CROSS-REFERENCE TO RELATED APPLICATIONS

This application is the national stage of International Application No. PCT/US19/32568, filed May 16, 2019, entitled System and Method for Manufacturing a System for Filtering and Disinfecting Drinking Water and is incorporated by reference herein in their entirety.

FIELD OF THE INVENTION

The present invention relates to water processing, and more particularly, is related to a water purifier.

BACKGROUND OF THE INVENTION

Many kitchen appliances, refrigerators for example, provide drinking water and/or ice dispensers. These appliances typically include a water filter assembly, a typical example 100 is shown in FIGS. 1A-1B. The broad white arrows indicate water flow. Water flows from a filter inlet 110 through an activated carbon filter cartridge 130 (shown with a heavy dashed outline) within a main housing 150. The main housing 130 has an axial length D. The filter cartridge 130 contains a carbon filter block 132 that is generally cylindrical in shape with a central channel 135 at the inner core of the filter block 132 of activated carbon. Activated carbon is porous, so the level of filtration is directly related to the pore size. The water enters the central channel 135 from the filter inlet 110 and flows through the filter block 132 (indicated by cross-hatches) through an outer liner (not shown) to prevent carbon particulates from becoming part of the water supply. After passing through the carbon filter 130 and outer liner, the filtered water then flows to a filter outlet 120. Plastic end caps 140 are attached to the filter cartridge at either end of the carbon cylinder to direct water flow and provide structural support. One or more sealing O-rings 145 may be located at an inlet of the carbon insert 130 to prevent leakage between the filter inlet 110 and the filter cartridge 130.

The main housing 150 is generally a solid material, for example, plastic or metal. The activated carbon filter runs the length of the housing 150 and substantially fills the interior of the housing 150. While in some instances the housing 150 may be openable to facilitate replacement of the filter cartridge 130, more often the entire water filter assembly 100 is replaced.

The activated carbon filter cartridge 130 provides mechanical (particulate) and chemical filtration. At best these types of filters can provide very limited microbial disinfection. These water filters typically remove certain chemical contaminants, particulates, and, in some cases, relatively large microbiological organisms. These filters do not remove smaller microbiological organisms from drinking water. While removal of such organisms may be performed by separate treatment units, this entails extra space and adds complexity and costs. Therefore, there is a need in the industry to address one or more of these shortcomings.

SUMMARY OF THE INVENTION

Embodiments of the present invention provide a system and method for filtering and disinfecting drinking water. Briefly described, the present invention is directed to a water filter system with a water filter assembly and an enclosure. The water filter assembly has a housing with a water inlet and a water outlet, a filter portion within the housing, and a reservoir portion within the housing apart from the filter portion. A window in the housing conveys ultraviolet light into the reservoir from an external light source. A water channel conveys water from the inlet to the outlet through the filter and the reservoir portions. The enclosure removably receives the water filter assembly in a cavity within the enclosure. An enclosure water inlet mates with the filter water inlet, and an enclosure water outlet mates with the filter water outlet. A light source within the enclosure is arranged to direct light into the reservoir portion.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 1A is a diagram showing a prior art filter without a window.

FIG. 1B is a diagram showing a cutaway view of the prior art filter of FIG. 1A.

FIG. 3A is a diagram showing a second exemplary embodiment of a water filter from a side view.

FIG. 3B is a diagram of the water filter of FIG. 3A from a bottom view.

FIG. 3C is a cutaway diagram of the water filter of FIG. 3A from a side view.

DETAILED DESCRIPTION

Figure 2A:
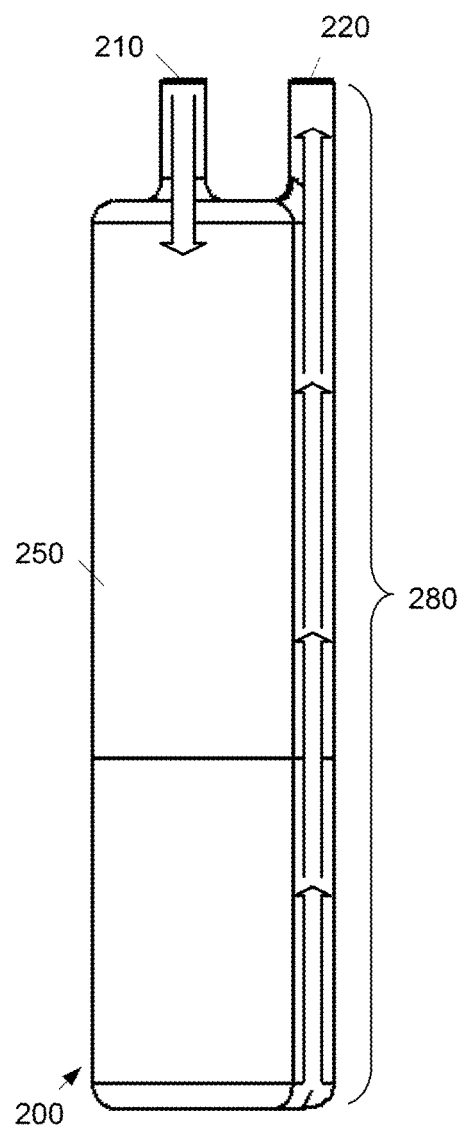
FIG. 2A is a diagram showing a first exemplary embodiment of a water filter from a side view.
Figure 2B:
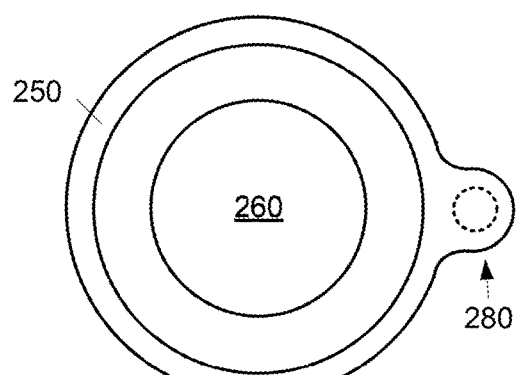
FIG. 2B is a diagram of the water filter of FIG. 2A from a bottom view.
Figure 2C:
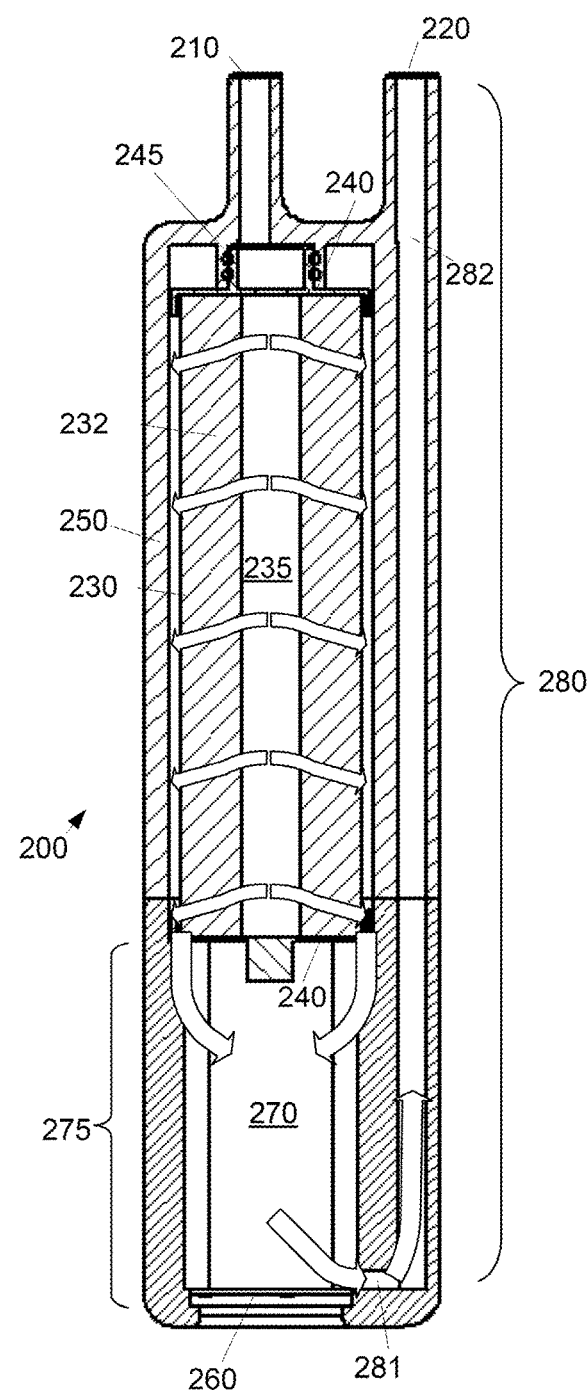
FIG. 2C is a cutaway diagram of the water filter of FIG. 2A from a side view.

The following definitions are useful for interpreting terms applied to features of the embodiments disclosed herein, and are meant only to define elements within the disclosure.

As used within this disclosure, "filter" is refers to a device having a fluid path through a porous solid or packed granule material to remove particles smaller than the pore size from the fluid. In general, filtering refers to a mechanical removal of particulates from fluid. However, as the embodiments described below include both mechanical filtering and UV disinfecting aspects, when referring to the overall water processing performed by the embodiments "filtering" may refer to both mechanical filtering and UV disinfecting.

Reference will now be made in detail to embodiments of the present invention, examples of which are illustrated in the accompanying drawings. Wherever possible, the same reference numbers are used in the drawings and the description to refer to the same or like parts.

FIGS. 2A-2D show a first exemplary embodiment of a water filter 200. The broad white arrows indicate water flow. Water enters the water filter 200 via a filter inlet 210. For example, the filter inlet 210 receives water from an external water source. Water flows from the filter inlet 210 through an activated carbon filter cartridge 230 disposed within a main housing 250. The filter cartridge 230 contains a filter block 232, for example of activated carbon, that is generally cylindrical in shape with a central channel 235 running axially through the filter block 232 at the inner core of the filter block 232. Under the first embodiment 200, the filter cartridge 230 may be similar to or identical to a conventional filter cartridge 130 (FIG. 1). The water enters the central channel 235 from the filter inlet 210 and flows through the filter block 232 through an outer liner (not shown) to prevent carbon particulates from becoming part of the water supply. After passing through the filter cartridge 230 and outer liner, the filtered water pools in a reservoir 270 at the base of the filter 200, and then flows through an egress channel 280 to a filter outlet 220. Plastic end caps 240 are attached to the filter cartridge at either end of the carbon cylinder to direct water flow and provide structural support. One or more sealing O-rings 245 may be located at an inlet of the filter cartridge 230 to prevent leakage between the filter inlet 210 and the filter cartridge 230.

Figure 2D:
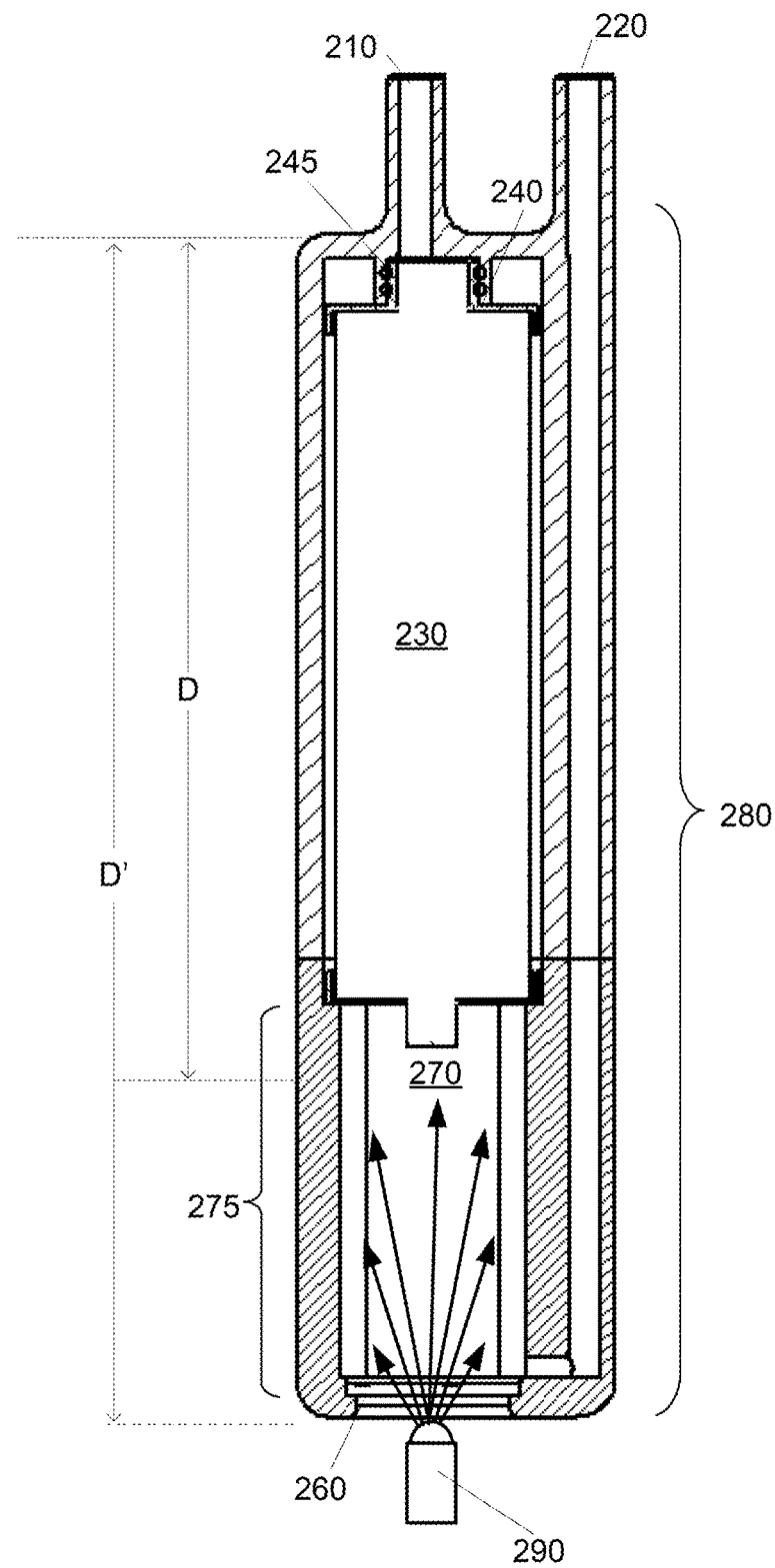
FIG. 2D is a cutaway diagram of the water filter of FIG. 2A from a side view with an external light source.

The main housing 250 is generally a solid material, for example, plastic or metal. As shown by FIG. 2D, the main housing 250 has an axial length D' greater length than the length D of the main housing 150 (FIG. 1) of a conventional water filter to reserve space for the reservoir 270. The filter cartridge 230 only fills a top portion the housing 250, leaving room at the bottom of the housing 250 for the reservoir 270. The interior of the housing 250 may include a mechanism to keep the filter cartridge 230 from intruding into the reservoir 270. For example, an annular shelf or other physical obstacle may be positioned at a top portion of the reservoir 270. As another example, at least one end cap 240 may include a snap-in and/or compression feature.

The egress channel 280 may be formed along the surface of the housing 250 in a ridge that protrudes outward from the cylindrical housing 250. The egress channel 280 has a channel inlet 281 in fluid communication with the reservoir 270 to draw filtered water from the reservoir 270 into the egress channel 280. The egress channel 280 has a channel outlet 282 in fluid communication with the filter outlet 220 to provide a path for the filtered water to exit the water filter 200. Alternatively the egress channel 280 may be perpendicular to the inlet 210. In this case, the egress channel 280 is not formed along the surface of the housing 250 but perpendicular to it.

A window 260 at the base of the housing 250 is configured to allow light from a light source 290 (FIG. 2D) external to the housing 250 to enter the housing 250 into the reservoir 270. The window 260 may be made of fused silica, glass, plastic, or another material transparent to UV light. For example, the window 260 preferably has UV transmission of greater than 90% over a wavelength range of 220 nm-400 nm. The window 260 may be any optical element configured to allow light from a light source external to the housing 250 to enter the housing 250 such as a lens, diffuser and/or lens/collimator. Alternatively, the light source 490 may be configured to provide light having a wavelength range of 260 nm to 400 nm, and the window 260 configured to provide at least 50% transmission over the wavelength range, for example, to cover grades of plastics which have a higher than normal UVC transmission (plastics have a lower transmission and narrower band than fused silica, however as more intense LEDs may be used with such grades of plastic).

FIG. 2D shows an external light source 290, for example, one or more light emitting diodes configured to produce ultra-violet (UV) radiation, indicated by arrows extending upward and outward from the external light source 290 through the window 260 and into the reservoir 270. One or more surfaces of the reservoir 270 may include one or more reflective surfaces, formed of Teflon® or another UV reflective material, to allow the UV radiation to reach areas of the reservoir that may not be in a direct path from the light source 290 through the window 260.

While the water is pooling in the reservoir 270, it is then exposed to UV radiation provided by the light source 290 entering the reservoir via the window 260. This radiation inactivates the microorganisms in the water of the reservoir 270 providing a higher level of microbial disinfection than provided by carbon filtering alone. It should be noted that a conventional filter 100 (FIG. 1) does not provide a window to allow light within the main housing 150 (FIG. 1).

FIGS. 3A-3C show a second exemplary embodiment of a water filter 300. The broad white arrows indicate water flow. Water enters the water filter 300 via a filter inlet 310. For example, the filter inlet 310 receives water from an external water source. Water flows from the filter inlet 310 through an activated carbon filter cartridge 330 disposed within a main housing 350. The filter cartridge 330 contains a filter block 332, for example of activated carbon, that is generally cylindrical in shape with a central channel 335 running axially through the filter block 332 at the inner core of the filter block 332. Under the second embodiment 300, the filter cartridge 330 may be similar to or identical to a conventional filter cartridge 130 (FIG. 1).

The second embodiment 300 may have a rotationally symmetric housing, which may allow for less expensive assembly methods like spin-welding. Further, a rotationally symmetric housing allows for uniform wall thickness, further simplifying the manufacturing process. Additionally, rotationally symmetric parts have a more uniform distribution of forces under pressure.

The water enters the central channel 335 from the filter inlet 310 and flows through the filter block 332 through an outer liner (not shown) to prevent carbon particulates from becoming part of the water supply. Plastic end caps 340, 341 are attached to the filter cartridge at either end of the carbon cylinder to direct water flow and provide structural support. One or more sealing O-rings 345 may be located at an inlet of the filter cartridge 330 to prevent leakage between the filter inlet 310 and the filter cartridge 330. A top cap 340 may provide a water seal to the activated filter cartridge 330 and include a cylindrical portion that runs length of the activated filter cartridge 330 to prevent input water from mixing with (filtered) output water. A bottom cap 341 between the filter block 332 and the reservoir 370 may provide a water seal to the filter block 332 and provide mechanical support to the activated filter cartridge 330. After passing through the carbon filter 330 and outer liner, the filtered water pools in a reservoir 370 at the base of the water filter 300, and then flows through an egress channel between the exterior of the top cap 340 and the housing 350 to a filter outlet 320.

As shown by FIG. 3B, the filter 300 has a substantially circular cross section. While alternative embodiments may have a different cross-sectional shape, a cylindrical filter may be preferable for commercial reasons as most filters have this shape.

The main housing 350 is generally a solid material, for example, plastic or metal. As with the first embodiment, the main housing 350 has an axial length greater than the length D of the main housing 150 (FIG. 1) of a conventional water filter to reserve space (length 375) within the housing 350 for the reservoir 370. The activated filter cartridge 330 only fills a top portion the housing 350, leaving room at the bottom of the housing 350 for the reservoir 370. The interior of the housing 350 may include a cartridge mounting mechanism 345 to keep the filter cartridge 330 from intruding into the reservoir 370. For example, the cartridge mounting mechanism 345 may include an annular shelf or other physical obstacle positioned at a top portion of the reservoir 370 and/or near the filter inlet 310 and filter outlet 320 end of the housing 350. One or both of the plastic end caps 340, 341 may also include mounting features used to secure the cartridge 330 to the housing 350, for example, by abutting, interlocking, and/or otherwise cooperating with the cartridge mounting mechanism 345. For example, the cartridge mounting mechanism 345 may have a ratchet design having pawl/tongue in item 345 and teeth (not shown) in the end cap 341. This is a preferred mechanism because no additional pieces are needed, however, other mechanisms are possible, for example, a snap in or twist-in mechanism (not shown).

Similarly to the first embodiment, under the second embodiment a window 360 at the base of the housing 350 is configured to allow light from a light source (not shown) external to the housing 350 to enter the housing 350 into the reservoir 370. The window 360 may be made of glass, plastic, or another material transparent to UV light. For example, the window preferably has UV transmission of greater than 90% over a wavelength range of 225 nm-400 nm. While the water is pooling in the reservoir 370, it is then exposed to UV radiation entering the reservoir via the window 360.

It should be noted that the configuration of the water inlet and water outlet shown in the above embodiments may be implemented differently in order to be compatible with different host appliances. However, this does not generally materially affect the functionality of the embodiments described above.

Figure 4:
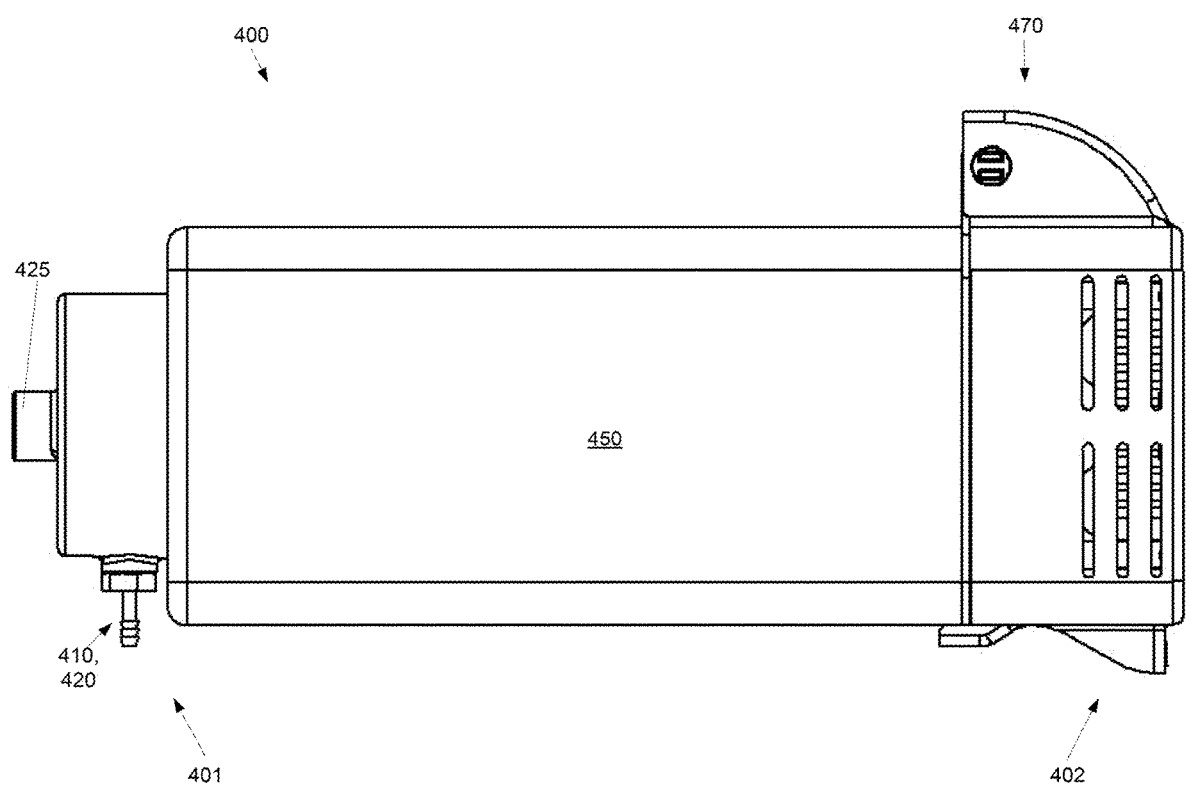
FIG. 4 is a diagram of a first embodiment enclosure for a water filter of FIG. 2A or 3A from a side view.
Figure 5:
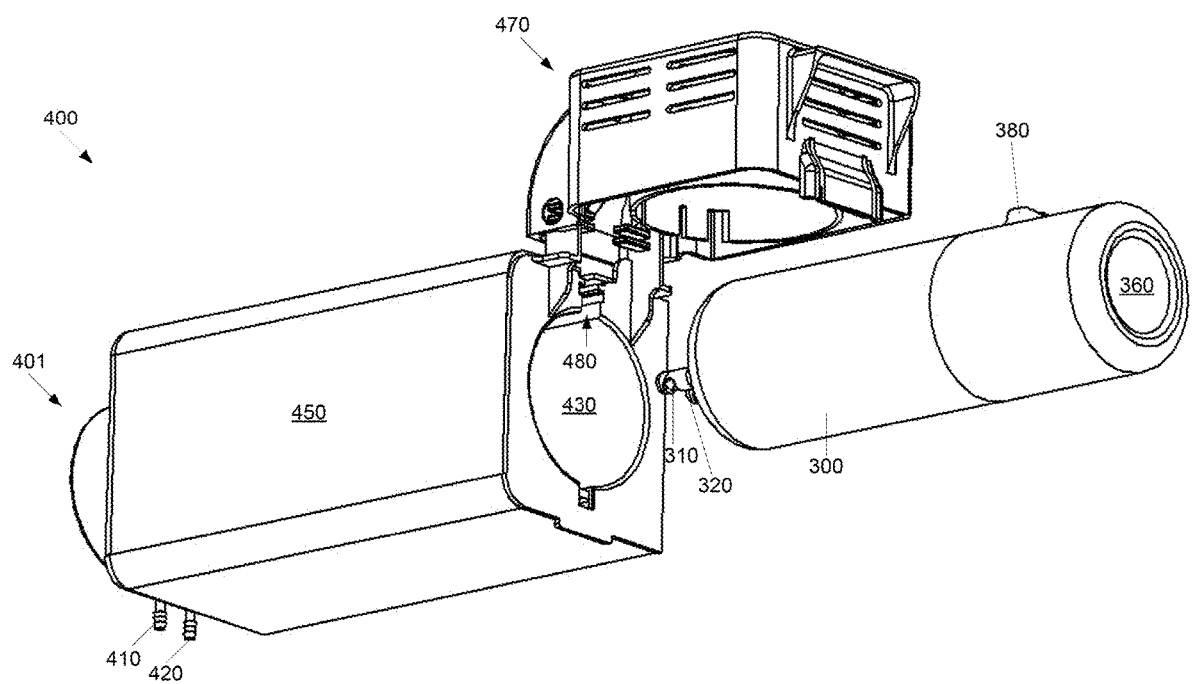
FIG. 5 is a diagram of the first embodiment enclosure FIG. 4 from a bottom perspective view with the door open.

FIG. 4 is a schematic drawing of a first embodiment of an enclosure 400 for a water filter, for example, the first embodiment water filter 200 or the second embodiment water filter 300. The enclosure 400 has a main body 450 or housing with a first end 401 having an enclosure electrical connector (not shown), a fluid interlock 425, and water attachments 410, 420, specifically an enclosure water inlet 410 receiving unfiltered water and providing unfiltered water to a water filter 200, 300 and an enclosure water outlet 420 receiving filtered water from the water filter 200, 300 and providing it to an external water receptacle. A door 470 is provided at a second end 402 of the main body 450. As shown by FIG. 5, when the door 470 is opened, the water filter 200, 300 may be inserted or removed from an enclosure cavity 430 within the enclosure 400. The water filter 300 is inserted into the enclosure such that the filter water inlet 310 and filter water outlet 320 enter the enclosure cavity 430 first. The water filter 300 may have an alignment tab 380 to ensure the filter water inlet 310 and filter water outlet 320 are aligned with the enclosure water inlet 410 and enclosure water outlet 420 when the water filter 300 is inserted into the enclosure 400. It should be noted that in alternative embodiments the water inlet 410 and water outlet 420 may be located in different locations, for example at opposite ends of the enclosure 400.

Figure 6:
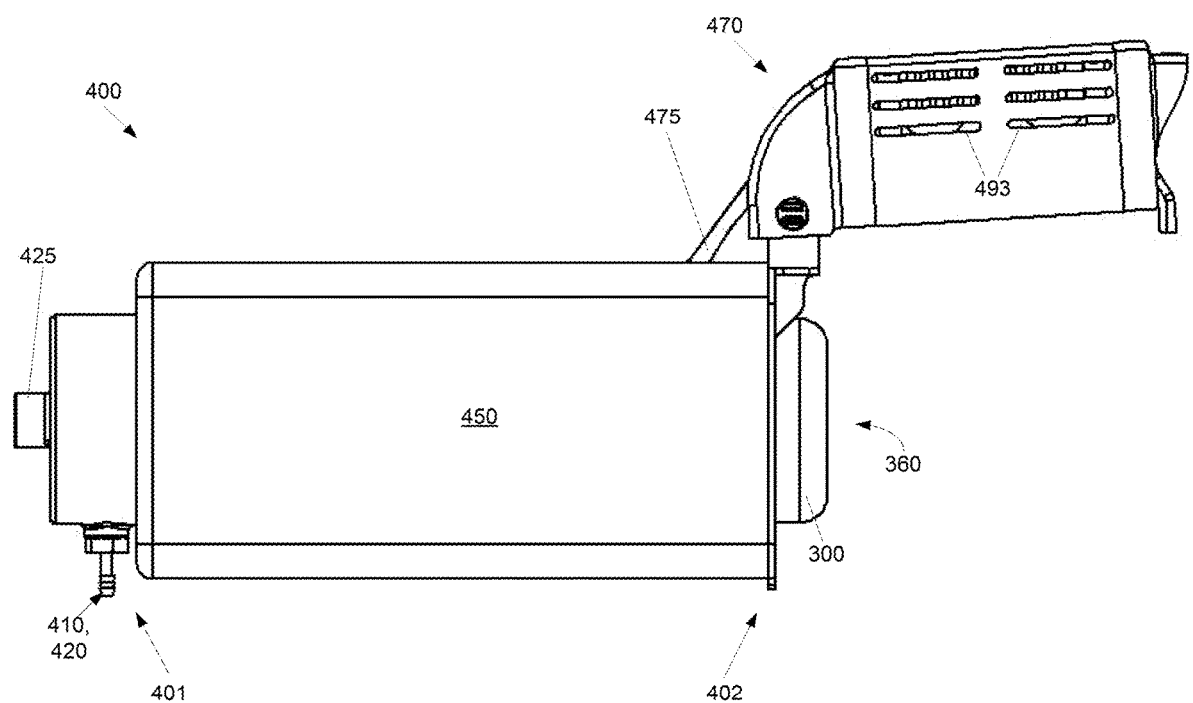
FIG. 6 is a diagram of the first embodiment enclosure FIG. 4 from a side view with the door open and filter inserted.
Figure 7:
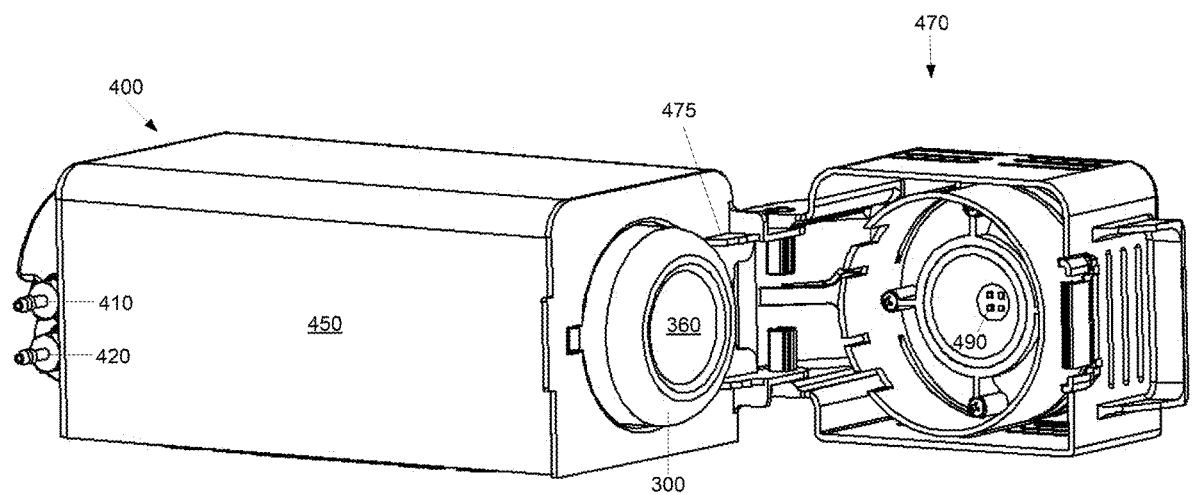
FIG. 7 is a diagram of the first embodiment enclosure FIG. 4 from a bottom view with the door open and filter inserted.

As shown by FIG. 6, after the water filter 300 is inserted into the enclosure 400, the enclosure door 470 may be shut, enclosing the water filter 300 within the enclosure 400. Under the first embodiment of an enclosure 400, the enclosure door 470 swings open with a pivot mechanism 475, for example, a hinge. The pivot mechanism 475 may also provide an electrical pathway from the enclosure electrical connector (not shown) to electrical components located in the door 470, for example, the enclosure light assembly 490, as shown in FIG. 7.

Figure 8A:
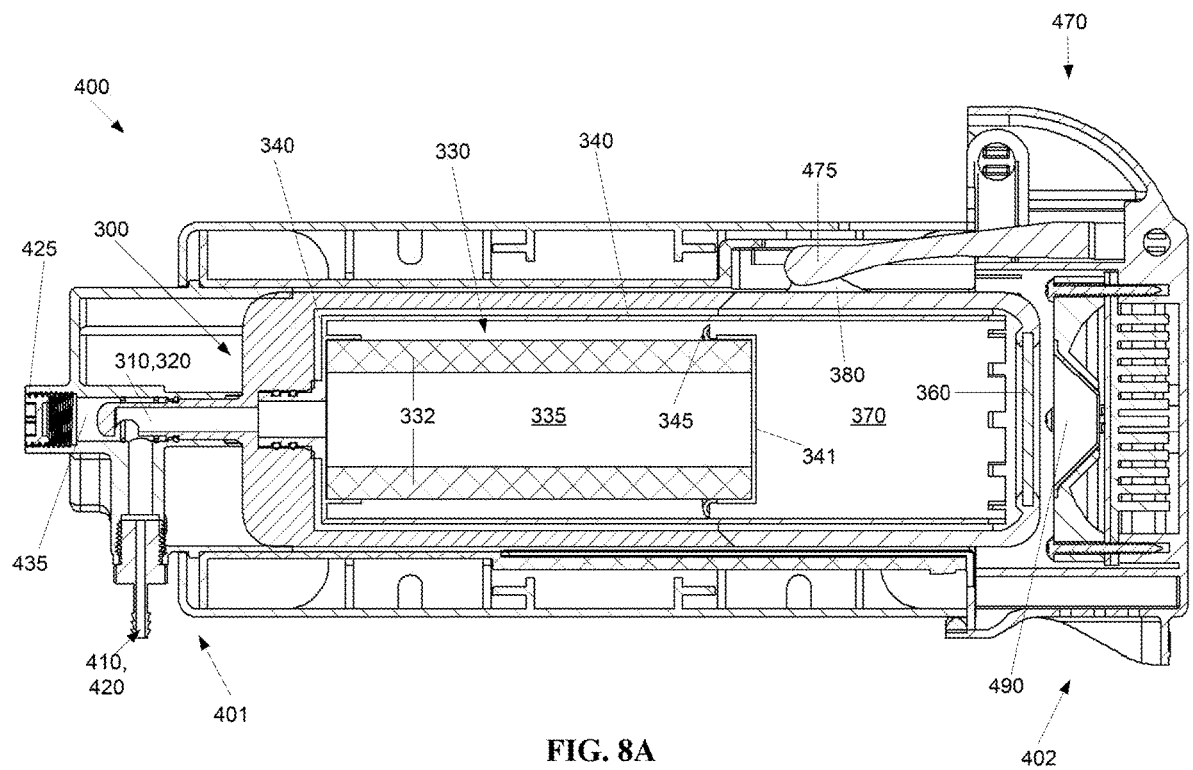
FIG. 8A is a cutaway diagram of the first embodiment enclosure FIG. 4 from a side view with the door closed and filter inserted.
Figure 8B:
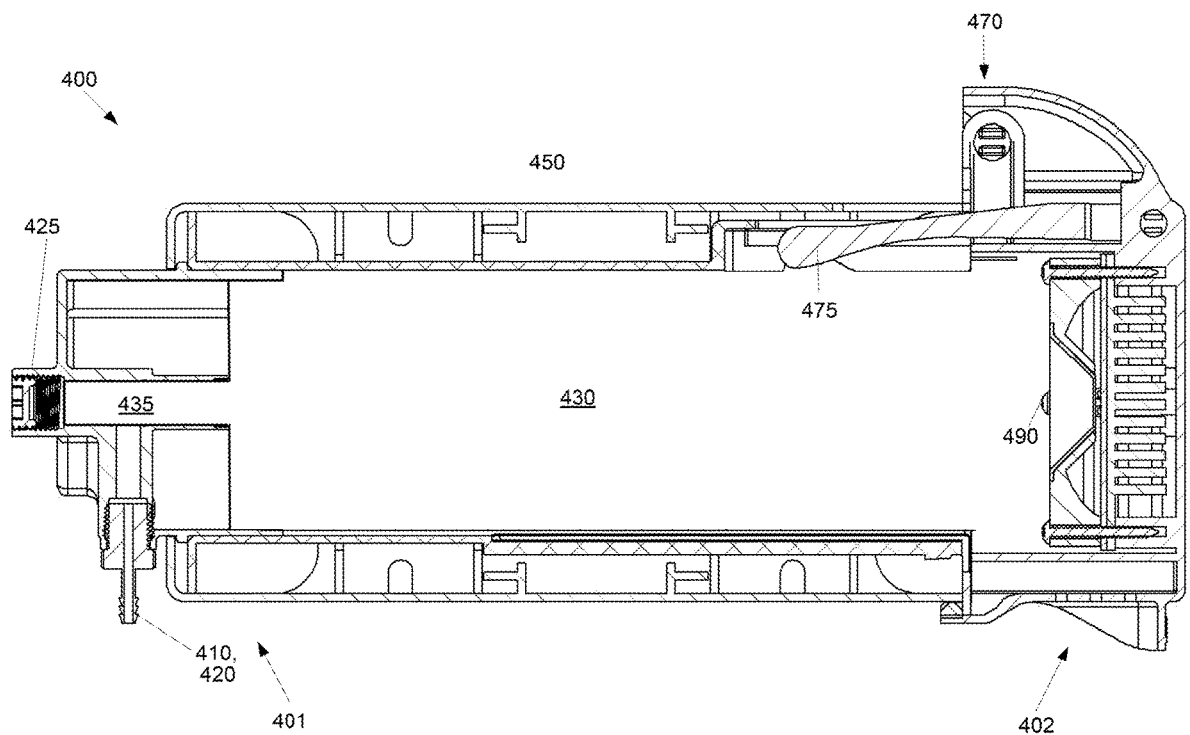
FIG. 8B is the cutaway diagram of FIG. 8A with the filter masked out for clarity.
Figure 9:
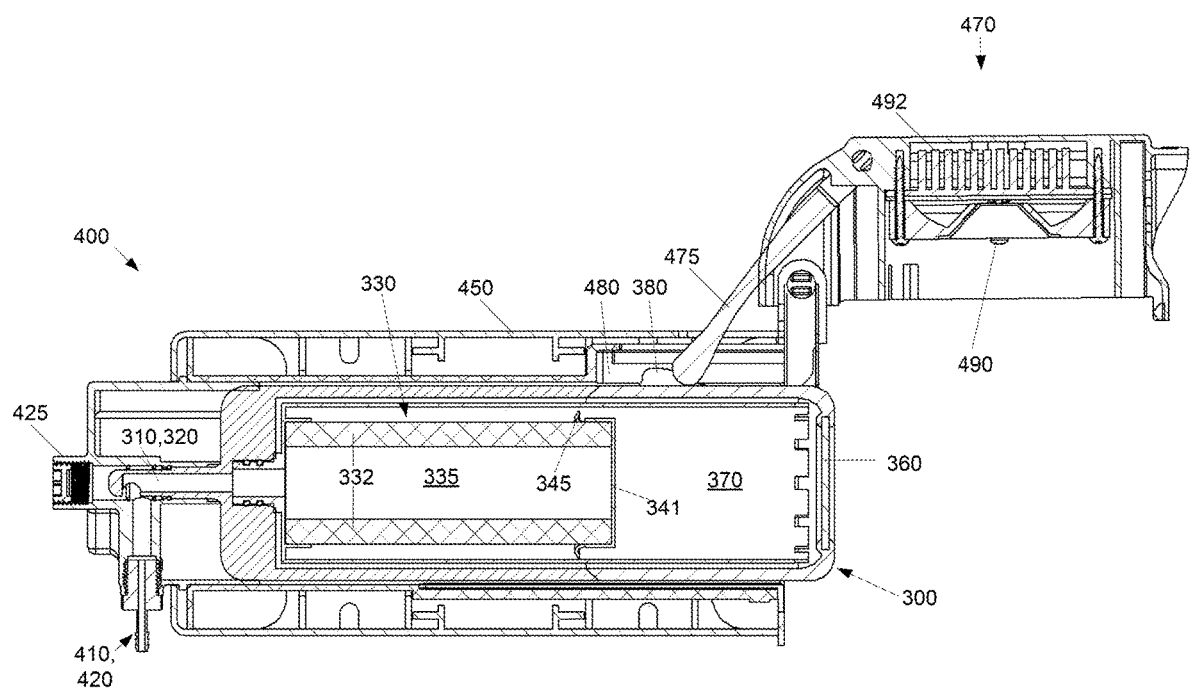
FIG. 9 is a cutaway diagram of the first embodiment enclosure FIG. 4 from a side view with the door open and filter inserted.

FIGS. 8A-8B, 9 are the cutaway diagram of the enclosure 400 (FIG. 8B has the filter masked out for clarity).

As shown in FIG. 8A, when the door 470 is closed with the filter 300 inside the enclosure 400, the enclosure light assembly 490 is arranged next to the filter cartridge window 360 so that the enclosure light assembly emits light through the filter cartridge window 360 into the reservoir 370. Under the first embodiment, the enclosure light assembly 490 includes one or more light emitting diodes (LEDs) emitting UV light having wavelengths in a range of 225 nm-400 nm. The enclosure light assembly 490 may be cooled via a heat sink 492 and vents 493 (FIG. 6) in the door 470 positioned near the heat sink 492.

While other light sources may be used, a preferred embodiment uses low voltage direct current (DC) UV LEDs. The preferred wavelength for the LED is 265 nm which is the peak absorption wavelength of nucleic acid. Nucleic acid is found in all forms of DNA and RNA. The LED power may be adjusted according to a desired water flow rate to preferably deliver a nominal dosage of 16mJ for the water flowing through the reservoir 370. However the LED power can be adjusted depending on the input water quality or another desired objective. Regardless of the final configuration the LEDs preferably deliver a minimum of 1 mW/cm$^2$ to the window 360.

When inserted into the enclosure, the filter water inlet 310 engages in fluid communication with the enclosure water inlet 410, and the filter water outlet 320 engages in fluid communication with the enclosure water outlet 420. For example, an interlock which can be actuated by the inlet 310 or a separate feature on the filter 300 opens a valve which allows water to flow into the inlet 310. When the filter 300 is removed, the interlock is closed preventing water from flowing. O-rings or similar gasket features may be attached to the inlet 310 and the outlet 320 to provide a water tight seal between the filter 300 and the enclosure 400.

FIG. 8A shows the filter water inlet 310 and outlet 320 inserted into an enclosure annex 435 within the first end 401 of the enclosure body 450.

While the first embodiment of the enclosure 400 opens with a pivoting door 470, in alternative embodiments the enclosure 400 may be opened by other means to facilitate replacing the filter 300, for example, but not limited to a screw threaded end portion or a friction fitted end portion.

While the first embodiment of the enclosure 400 is configured to entirely enclose the filter 300, alternative embodiments may merely hold the filter in place without entirely enclosing the filter 300, instead merely providing the enclosure water inlet 410 to engage with the filter water inlet 310, the enclosure water outlet 420 to engage with the filter water outlet 320, and a light source 490 providing light the through the filter cartridge window 360 into the reservoir 370.

The enclosure 400 may attach to the host appliance in various ways, preferably with a simple attachment feature, for example using screws with screw holes in the enclosure 400 and mating thread in the appliance or mating snap features between the enclosure 400 and the appliance. The enclosure 400 may be located anywhere on the appliance; ideally it should be located where the end user can access the enclosure 400 with minimal effort to replace the filter 300. The electrical connections can be made either via cable or male/female connector between the enclosure 400 and the host appliance.

Figure 10:
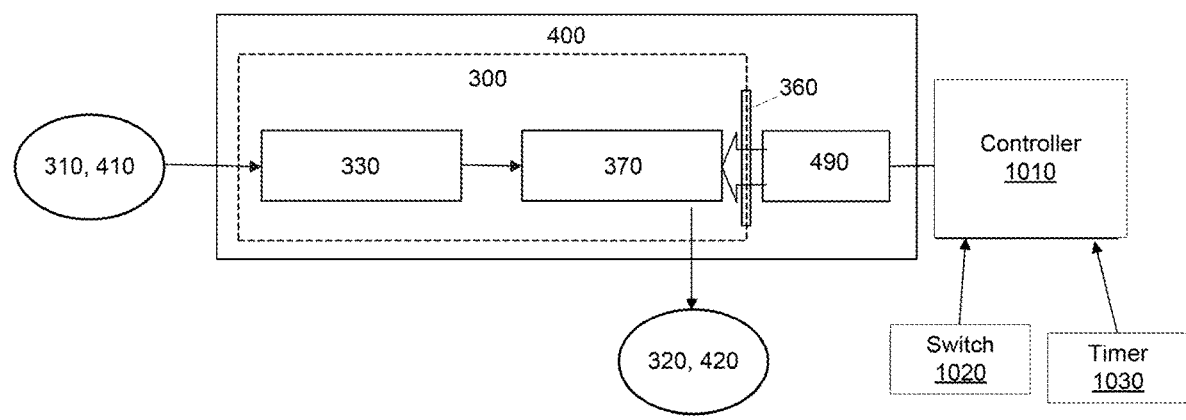
FIG. 10 is a schematic diagram of a first exemplary embodiment of a water filtering system.

As shown by FIG. 10, the enclosure 400 and filter 300 are part of a system 1000 for purifying water in an appliance. Water flows through the inlets 310, 410 into the filter cartridge 330 of the filter 300 within the enclosure 400, eventually passing through the filter cartridge 330 to pool in the reservoir 370. The light source 490 in the enclosure 400 is activated by a controller 1010 to emit UV radiation through the window 360 of the filter 300 into the reservoir 370. The purified water then exits the reservoir 370 via the outlets 320, 420. The controller 1010 may activate the light source 490 based upon an actuator, for example switch 1020, and/or based upon a timer 1030. Other actuating mechanisms are also possible, for example, the 1010 may monitor a flow sensor (not shown) and actuate the light source 490 based upon sensing water flowing into and/or out of the filter 300 or enclosure 400, for example, based upon a predetermined volume of water flowing into and/or out of the filter 300 or enclosure 400.

Figure 11:
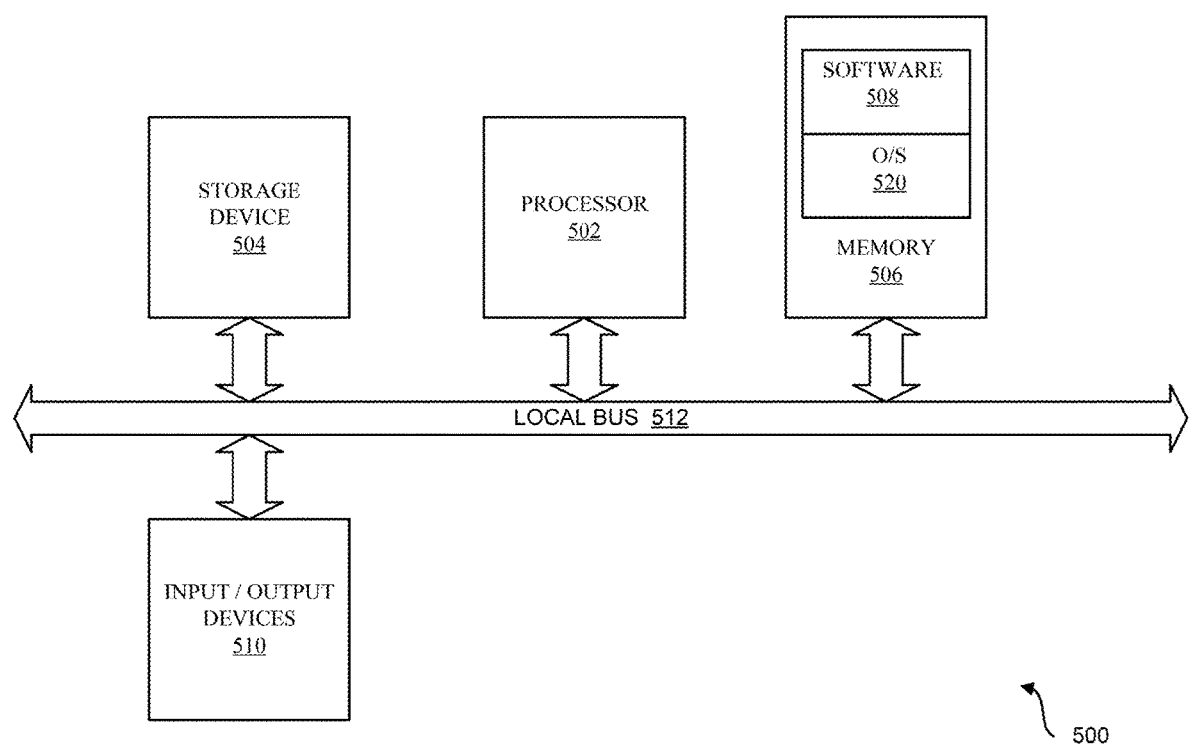
FIG. 11 is a schematic diagram illustrating an example of a system for executing functionality of the present invention.

The controller 1010 may be a computer, an example of which is shown in the schematic diagram of FIG. 11. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 12:
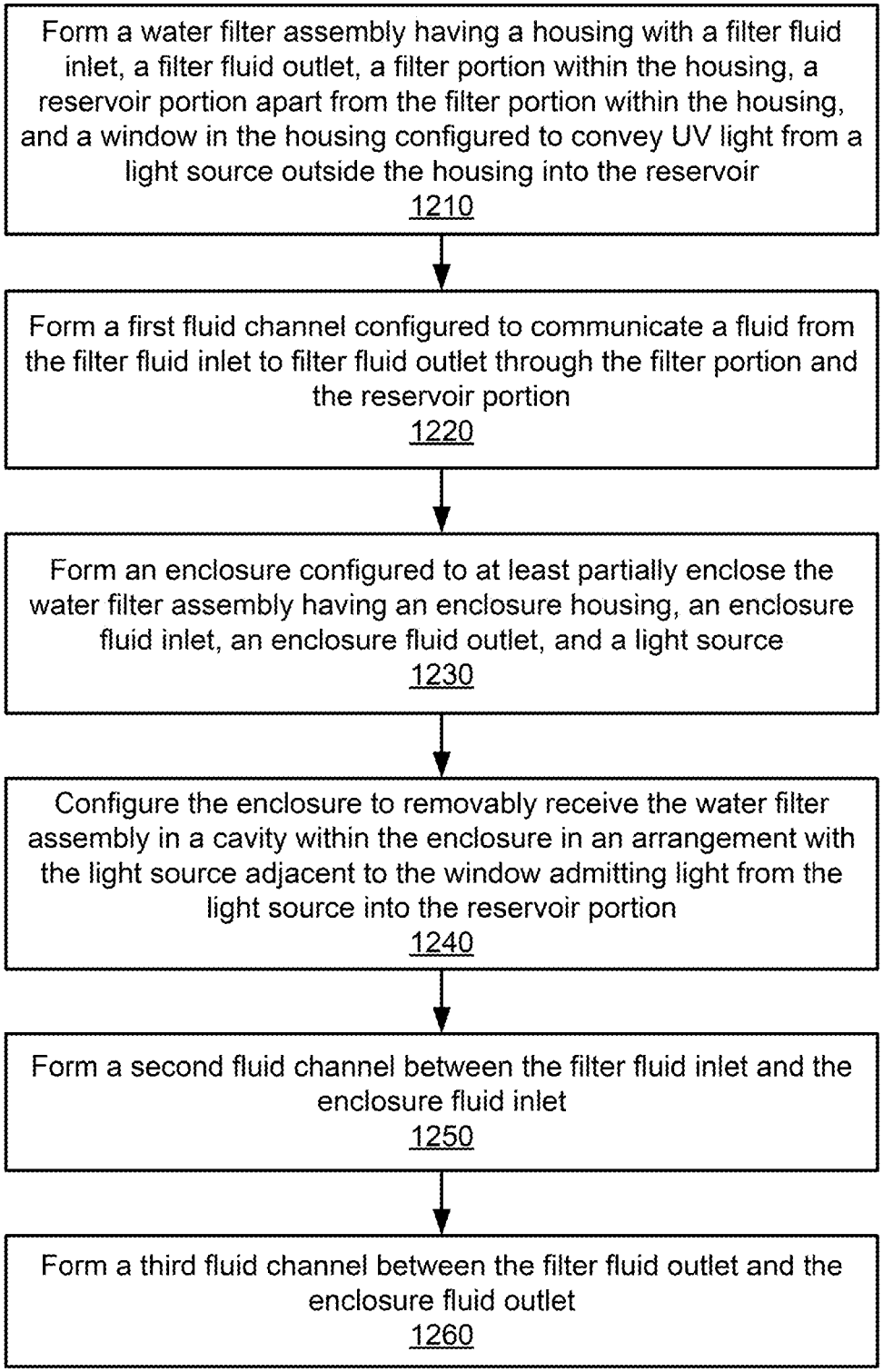
FIG. 12 is a flowchart illustrating an example of an exemplary method for forming a water filtering system.

FIG. 12 is a flowchart 1200 illustrating an example of an exemplary method for forming a water filtering system. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A water filter assembly 300 is formed having a housing 350 with a filter water inlet 310, a filter water outlet 320, a filter portion 330 within the housing, a reservoir portion 370 apart from the filter portion within the housing, and a window 360 in the housing configured to convey UV light from a light source 490 outside the housing into the reservoir, as shown by block 1210. A first fluid channel is formed configured to communicate a fluid from the filter fluid inlet to filter fluid outlet through the filter portion and the reservoir portion, as shown by block 1220. An enclosure 400 configured to at least partially enclose the water filter assembly, having an enclosure housing 450, an enclosure water inlet 410, an enclosure water outlet 420, and a light source 490, as shown by block 1230.

The enclosure 400 is configured to removably receive the water filter assembly in a cavity 430 within the enclosure 400 in an arrangement with the light source 490 adjacent to the window 360 admitting light from the light source 490 into the reservoir portion 370, as shown by block 1240. A second fluid channel is formed between the filter fluid inlet 310 and the enclosure fluid inlet 410, as shown by block 1250. A third fluid channel is formed between the filter fluid outlet 320 and the enclosure fluid outlet 420, as shown by block 1260.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A water filter system, comprising:
   a water filter assembly further comprising:
      a housing with a filter fluid inlet and a filter fluid outlet;
      a filter portion within the housing;
      a reservoir portion within the housing apart from the filter portion;
      a window in the housing configured to convey UV light into the reservoir portion from a light source outside the housing; and
      a fluid channel configured to communicate a fluid from the filter fluid inlet to the filter fluid outlet through the filter portion and the reservoir portion; and
   an enclosure configured to at least partially enclose the water filter assembly, comprising:
      an enclosure housing configured to removably receive the water filter assembly in a cavity within the enclosure;
      an enclosure fluid inlet configured to mate with the filter fluid inlet;
      an enclosure fluid outlet configured to mate with the filter fluid outlet; and
      the light source faces the window and directs light into the reservoir portion.

2. The system of claim 1, further comprising an electrical channel configured to convey electricity between an exterior portion of the enclosure and the light source.

3. The system of claim 1, wherein the enclosure housing further comprises a movable and/or removable portion configured to facilitate insertion of the water filter assembly into the cavity and/or removal of the water filter assembly from the cavity.

4. The system of claim 3, wherein the light source is mounted in the movable and/or removable portion.

5. The system of claim 1, wherein the light source is configured to provide light having a wavelength range of 220 nm to 400 nm, and the window is configured to provide at least 90% transmission over the wavelength range.

6. The system of claim 1, wherein the light source is configured to provide light having a wavelength range of 260 nm to 400 nm, and the window is configured to provide at least 50% transmission over the wavelength range.

7. The system of claim 1, wherein the filter portion comprises a filter material configured to provide mechanical and/or chemical water filtration.

8. The system of claim 1, further comprising a controller configured to activate the light source upon sensing a signal from one or more of the group consisting of an actuator, a timer, and a flow sensor.

9. The system of claim 1, wherein the light source comprises a light emitting diode array.

10. The system of claim 1, wherein the light source is configured to be cooled via a vent in the enclosure housing and/or a heat sink.

11. The system of claim 1, further comprising an alignment tab, wherein the alignment tab is configured to:
align the enclosure fluid inlet with the filter fluid inlet; and
align the enclosure fluid outlet with the filter fluid outlet.

12. A method for manufacturing a water filter system, comprising steps of:
forming a water filter assembly comprising a housing with a filter fluid inlet, a filter fluid outlet, a filter portion within the housing, a reservoir portion apart from the filter portion within the housing, and a window in the housing configured to convey UV light from a light source outside the housing into the reservoir portion;
forming a first fluid channel configured to communicate a fluid from the filter fluid inlet to filter fluid outlet through the filter portion and the reservoir portion;
forming an enclosure configured to at least partially enclose the water filter assembly, comprising an enclosure housing comprising a movable and/or removable portion, an enclosure fluid inlet, an enclosure fluid outlet, and a light source, wherein the enclosure is configured to removably receive the water filter assembly in a cavity within the enclosure in an arrangement with the light source adjacent to the window admitting light from the light source into the reservoir portion, wherein the movable and/or removable portion comprises a door, and wherein the light source is mounted in the movable and/or removable portion;
forming a second fluid channel between the filter fluid inlet and the enclosure fluid inlet; and
forming a third fluid channel between the filter fluid outlet and the enclosure fluid outlet.

13. The method of claim 12, further comprising the step of providing an electrical channel between an exterior portion of the enclosure and the light source.

14. The method of claim 12, wherein the movable and/or removable portion is configured to facilitate inserting the water filter assembly into the-cavity and/or removing the water filter assembly from the cavity.

15. The method of claim 12, wherein the light source is configured to provide light having a wavelength range of 220 nm to 400 nm, and the window is configured to provide at least 90% transmission over the wavelength range.

16. The method of claim 12, wherein the light source is configured to provide light having a wavelength range of 260 nm to 400 nm, and the window is configured to provide at least 50% transmission over the wavelength range.

17. The method of claim 12, wherein the filter portion comprises a filter material configured to provide mechanical and/or chemical water filtration.

18. A water filter system comprising:
a water filter assembly, comprising:
a housing with a filter fluid inlet and a filter fluid outlet;
a filter portion within the housing;
a reservoir portion within the housing apart from the filter portion, wherein at least a first surface of the reservoir portion includes a UV reflective material;
a window in the housing configured to convey UV light into the reservoir portion from an external light source; and
a fluid channel configured to communicate a fluid from the filter fluid inlet to filter fluid outlet through the filter portion and the reservoir portion,
wherein the filter portion comprises a filter material configured to provide mechanical and/or chemical water filtration; and
an enclosure configured to at least partially enclose the water filter assembly, comprising:
a movable and/or removable portion, wherein the movable and/or removable portion comprises a door.

19. The water filter assembly of claim 18, wherein the window is configured to provide at least 90% transmission over a wavelength range of 220 nm to 400 nm.

20. The water filter assembly of claim 18, wherein the external light source is configured to provide light having a wavelength range of 260 nm to 400 nm, and the window is configured to provide at least 50% transmission over the wavelength range.

* * * * *